Feb. 13, 1951  R. O. GANGEWERE  2,541,695
SPRAYING APPARATUS
Filed June 5, 1945  3 Sheets-Sheet 1
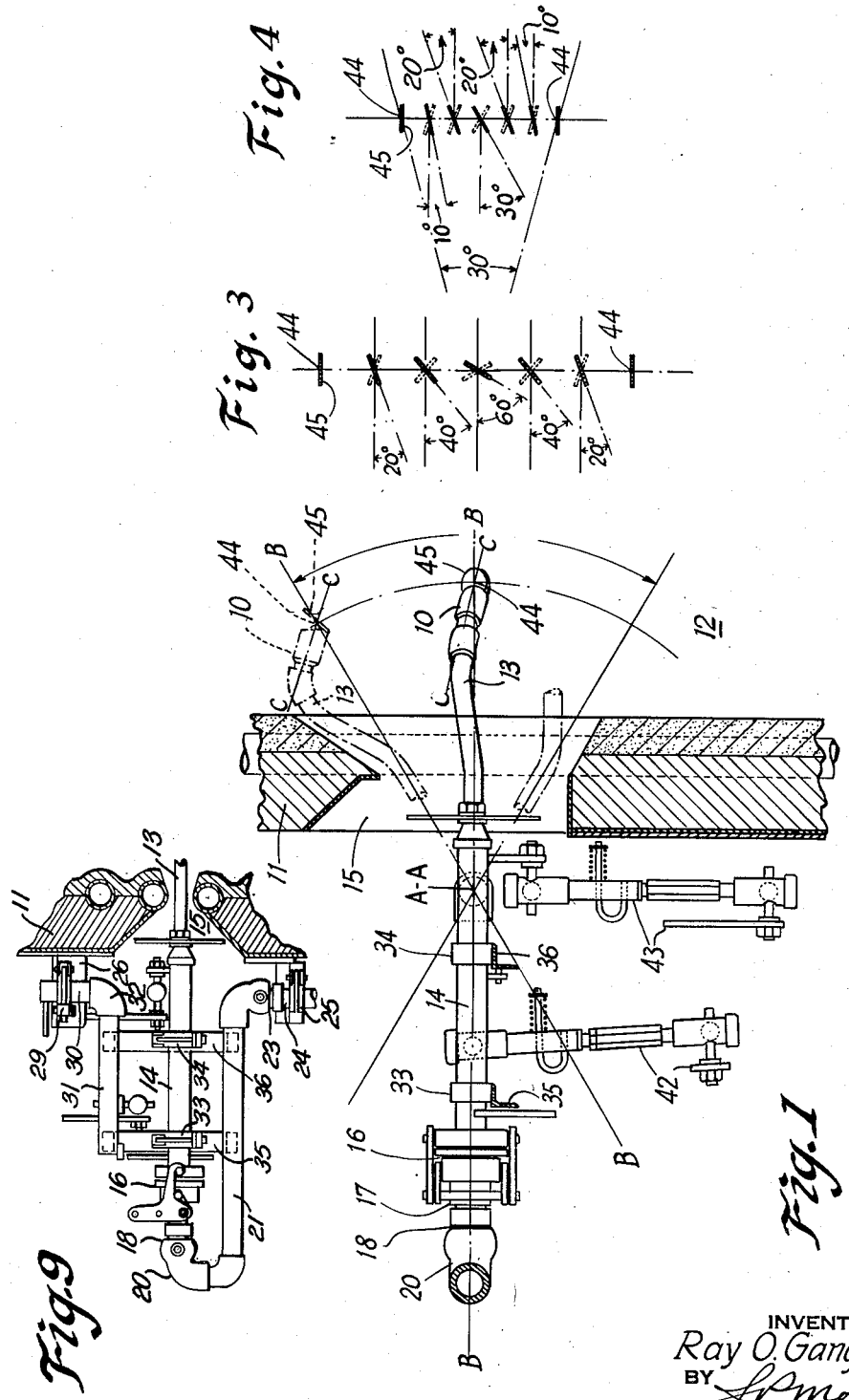
INVENTOR
Ray O. Gangewere
BY
ATTORNEY Feb. 13, 1951  R. O. GANGEWERE  2,541,695
SPRAYING APPARATUS
Filed June 5, 1945  3 Sheets-Sheet 2
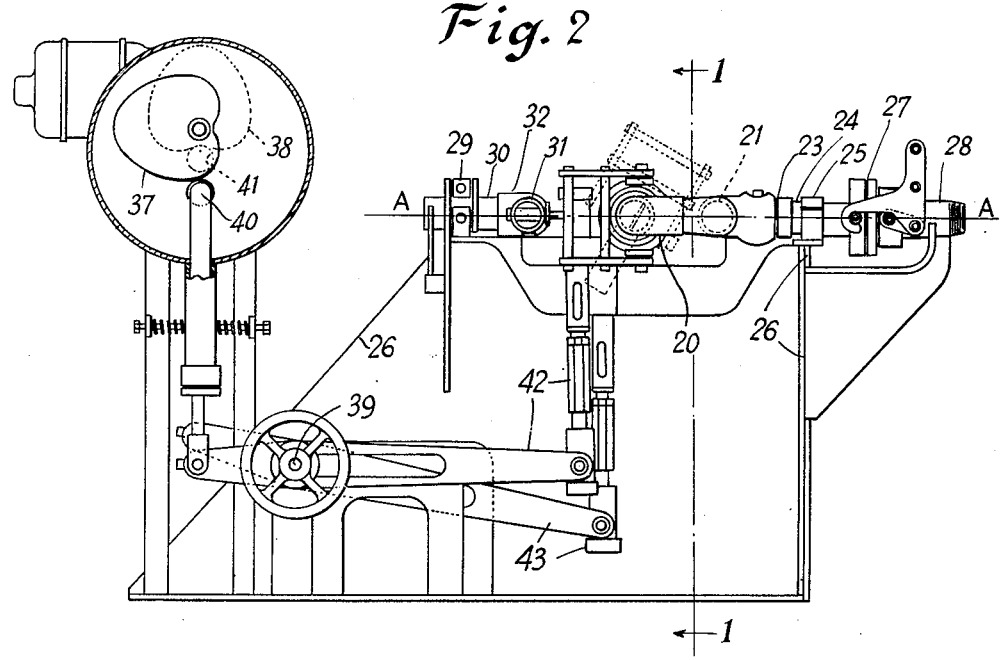
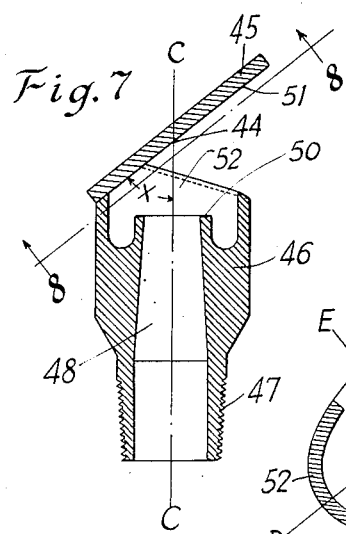
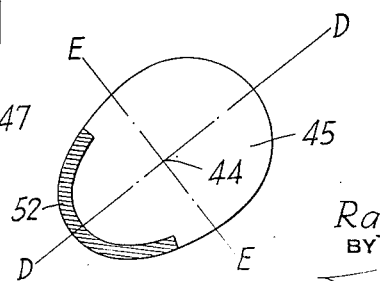
INVENTOR
Ray O. Gangewere
BY
ATTORNEY INVENTOR
Ray O. Gangewere
ATTORNEY Patented Feb. 13, 1951

2,541,695

UNITED STATES PATENT OFFICE 2,541,695

SPRAYING APPARATUS

Ray O. Gangewere, Wadsworth, Ohio, assignor to The Babcock & Wilcox Company, Rockleigh, N. J., a corporation of New Jersey Application June 5, 1945, Serial No. 597,633

3 Claims. (Cl. 299—62)

The present invention relates in general to the construction and operation of spray nozzles, and more particularly, to an improved construction and mounting of an oscillatory spray nozzle of the type adapted for use in chemical recovery furnaces of the character disclosed in U. S. Patent 2,161,110.

In chemical recovery processes wherein a residual liquor, such as the "black liquor" from pulp digestors used in the kraft or sulphate process of manufacturing paper pulp, is delivered to a furnace for the recovery of inorganic chemicals and for the production of useful heat by burning the combustible organic material contained in the liquor, the liquor is sprayed across the furnace onto the side walls of the furnace as one step in the recovery process. The amount of liquor handled in the furnace, the efficiency of chemical and heat recovery, and the reliability of the process, depend to a great extent upon a substantially uniform deposition of the liquor over a predetermined wall area of the furnace. If the deposition of liquor on the walls of the furnace is so uneven, that a portion or portions of the wall surface would receive a materially greater amount of sprayed liquor than other portions of the wall surfaces, so-called "wet spots" may result, at which the moisture content of the sprayed liquor would not be rapidly evaporated to the degree desired. Such a wall condition may result in an undesirable moisture content of part of the char which builds up on the furnace walls and breaks off in lumps therefrom, falling onto the furnace hearth. Conversely, if a portion or portions of the wall surface should receive an insufficient amount of sprayed liquor, the moisture content might be too quickly evaporated and a portion of the inorganic chemicals sublimed by overheating, which also is undesirable.

The main object of the present invention is to improve the liquor distribution characteristics of a spray nozzle assembly especially adapted for chemical recovery furnace applications. A further and more specific object is to provide a mount for a spray nozzle capable of being oscillated simultaneously about two axes normal to each other so that the center of oscillation of the nozzle about one axis will remain in the plane of movement of the nozzle in its oscillation about the other axis. An additional object is to provide a means for mounting a spray nozzle used in conjunction with a chemical recovery furnace whereby the path of the movements thereof will be an accurate reproduction of the movements initiated by the oscillating mechanism.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Of the drawings:

Fig. 1 is a side elevation, partly in section, of the spray nozzle mount of the present invention, and an oscillating mechanism therefor;

Fig. 2 is an end elevation of the oscillating mechanism shown in Fig. 1;

Fig. 3 is a diagram showing the maximum amplitude of movement of the spray nozzle during one cycle of the oscillation thereof;

Fig. 4 is a diagram showing the movement of the spray nozzle during one cycle of oscillation thereof through an amplitude of movement less than that shown in Fig. 3;

Fig. 7 is an enlarged sectional view of the spray nozzle;

Fig. 8 is a section taken on line 8—8 of Fig. 7; and

Fig. 9 is a plan view of a portion of the apparatus shown in Figs. 1 and 2.

Figure 5:
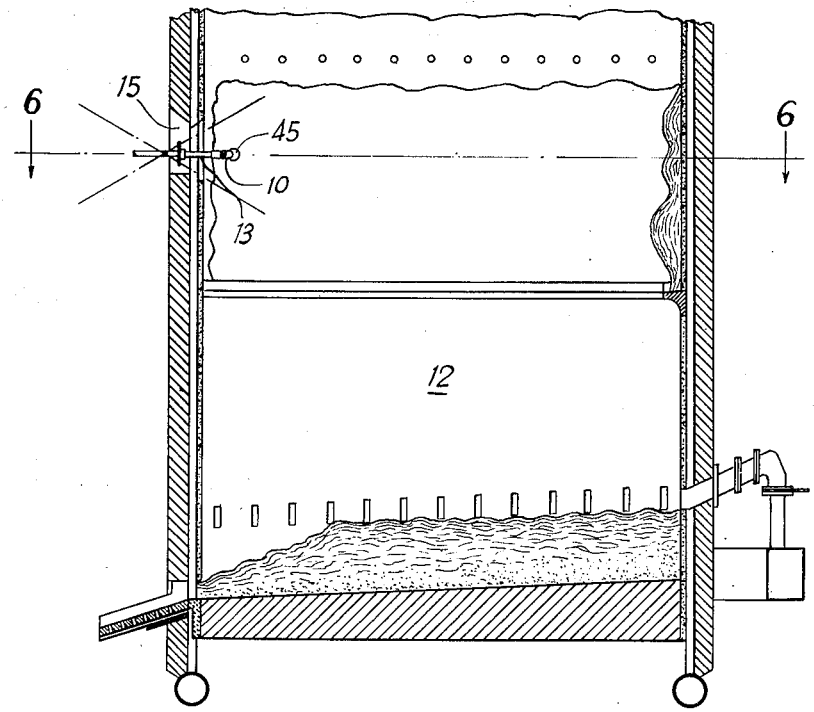
Fig. 5 is a sectional elevation of a chemical recovery furnace including a spray nozzle mounted in accordance with the present invention.

As shown in the drawings and particularly in Fig. 1, a spray nozzle 10, of the general type shown in U. S. Patent 2,161,111, is positioned adjacent the front wall 11 of a chemical recovery furnace 12. The general type of furnace is disclosed in U. S. Patent 2,161,110 and is illustrated in an operating condition in Figs. 5 and 6. In such an installation a pulp residual liquor is delivered to a spray nozzle which is adapted to discharge the liquor as a relatively coarse spray in a substantially flat sheet having an angularity of approximately 180°. Since as shown particularly in Figs. 5 and 6, the spray impacts the rear and side walls of the furnace 12 in a relatively narrow band across substantially the entire horizontal cross-section of the furnace, the nozzle is advantageously mounted so as to permit continuous predetermined oscillatory movements to extend the area of liquor impact on the walls of the furnace.

A suitable mount for this purpose is shown in Figs. 1, 2 and 9 wherein the nozzle is mounted on the inner or furnace end of a conduit 13 which conducts the liquor from a supply pipe 14 to the nozzle 10 and is so formed as to place the nozzle in proper relation to the axes of rotation that the desired effect is secured. The nozzle 10 on its supporting pipes 13 and 14 is projected through a vertically elongated port 15 in the furnace front wall 11. The supply pipe 14 is extended outwardly of the wall 11 to a toggle joint 16 which connects with a short pipe 17 fitted into a ball bearing swing joint 18. The joint 18 is formed in one end of a reverse bend 20 attached to another section of liquor supply pipe 21 parallel to pipe 14 and ending near the wall 11 in a 90° elbow equipped with a second ball bearing swing joint 23 similar to the joint 18. The joint 23 engages a pipe 24 having a horizontal axis parallel to the wall 11 and is maintained in position by a quick opening clamp 25 which is supported by a frame 26. The pipe 24 ends in a toggle joint 27 and a pipe fitting 28 suitable for connection to a liquor supply source (not shown). On the opposite side of the pipe 14, a quick opening bearing 29, also supported by the frame 26, embraces a short section of pipe 30 which is attached to another pipe 31 by a 90° elbow 32. The pipe 31 extends away from the wall 11 and is parallel to the supply pipe 14. Two quick opening bearings 33 and 34 are spaced axially along the pipe 14 and are supported by angle irons 35 and 36 respectively which are welded to the undersides of pipe 21 and pipe 31 respectively. With this construction, the pipes 14, 21 and 31 are maintained in the same plane and are rotatable as a unit about a horizontal axis A—A parallel to the furnace front wall 11 and passing through the axial centers of the swing joint 23 and the bearing 29. Likewise, the pipe 14 is rotatable about its longitudinal axis B—B which is in alignment with the bearings 33 and 34, and the swing joint 18.

As disclosed and claimed in a copending application of Richard S. Leigh, Serial No. 571,175, filed January 3, 1945, now Patent No. 2,518,239, oscillating movements of the spray nozzle 10 about the axes A—A and B—B are obtained by transmitting reciprocating motions produced by a pair of duplicate motor driven cams 37 and 38 and individual cam-followers 40 and 41 through separate linkages 42 and 43 connected with the spray nozzle mount. The reciprocating motion of each cam-follower is uniform as to the length of its stroke and the linear velocity thereof is substantially uniform throughout both the upward and downward strokes of its movement. Any desired change in the amplitude of the nozzle oscillation about either axis is obtained by adjustment of the linkages 42 and 43, as by the position of the fulcrum rod 39 in the linkage 42.

The spray nozzle 10 is described in detail in the U. S. Patent 2,161,111 previously mentioned and is shown in Figs. 7 and 8. In the construction shown, a nozzle body 46 having a threaded rear end 47 for connection to a liquor supply pipe, is provided with a passage 48 tapering from the liquor supply end to a uniform circular discharge end 50. A spray plate 45 is included in the nozzle assembly and is spaced from the discharge end of the body 46 in a position intercepting the liquor jet discharging from the passage 48. The spray plate 45 has a substantially flat liquor impact surface 51 positioned at a predetermined angle X with respect to the axial centerline C—C of the passage 48. As shown in Fig. 8, the plate 45 is of generally elliptical shape and is symmetrical about its longitudinal centerline D—D which is intersected by the centerline C—C at a point 44 on the upper impact surface 51. A hood 52 is formed by a tubular extension to the outer circular portion of the body 46. A lower segment of the hood 52 is welded to the impact surface of the plate 45 substantially as shown so that the forward segment of the hood is open for the discharge of the liquor spray and is symmetrical with respect to the centerline D—D. With the nozzle construction described and an angle X of approximately 50°, the liquor spray will be discharged from the plate 45 in a thin sheet confined to an angular area of approximately 180°.

As described in the said copending application, the movements transmitted to the pipe 14 by the mechanism described produces an oscillation thereof having a substantially uniform angular velocity about the axes A—A and B—B. Advantageously the spray nozzle 10 is connected to the pipe 14 so as to accurately transmit such movements and thus maintain a nozzle oscillation of a substantially uniform angular velocity.

In accordance with my invention this is accomplished by bending the pipe 13 and assembling the liquor supply pipes 13 and 14 with the nozzle 10 so that the center line C—C of the passage 48 and an extension of the axial centerline of the pipe 14, which is also the axis of rotation B—B, will intersect at the point 44 on the plate 45. Thus, during the oscillation of the nozzle 10 about the axes A—A and B—B, as hereinafter described, the center 44 of the plate 45 moves in an arc centered on the axis A—A and lying in a vertical plane through the axis B—B. In the embodiment of the invention shown in Fig. 1, the plane of the liquor impact surface of the plate 45 is perpendicular to a plane common with the centerline C—C and axis B—B, and the plate 45 is pitched about a line E—E on its impact surface, as shown in Fig. 8, which is normal to the axis B—B and passes through the point 44. Thus, the plate 45 may have an upward pitch, as shown in Fig. 1, so that the outer end of the plate is above the axis B—B or the plate may lie in the plane of the axis B—B. The angularity of plate pitch with respect to the axis B—B will depend upon the furnace 12 dimensions, the velocity of the liquor spray, and the desired elevation of the band of liquor deposited on the walls of the furnace. The pitch is therefore selected to compensate for the tendency of the liquor spray to be deposited on the furnace walls at elevations lower than the location of the nozzle 10, as caused by their flight trajectories.

Complete cycles of spray nozzles oscillation are illustrated in Figs. 3 and 4, in each of which a section of the nozzle plate 45 is shown as viewed from its inner edge and its position is shown at the end of equal increments of time in the oscillatory cycle. The full sections indicate one half of a cycle with the dotted sections indicating the other half of a cycle. The total elapsed time for the illustrated complete cycles is the same and the time intervals between the successive positions of the plate 45 are also equal. In Fig. 3 the amplitude illustrated is through an angularity of 60° about the axis A—A and simultaneously rotational oscillation of 120° about the axis B—B. In the apparatus shown, these angles represent the maximum amplitude of oscillation. The corresponding minimum amplitude of oscillation of this apparatus is 12° about the axis A—A and 24° about the axis B—B as limited by the fulcrum adjustment in the connecting linkages. Such a range of amplitude adjustment is provided in the apparatus so that a single size and type of oscillating mechanism may be applied to the customary range of sizes and shapes of commercial chemical recovery furnaces. This standardization of size and design of spray apparatus will advantageously simplify manufacture and reduce the cost of construction. However, if desired, the apparatus may be constructed for either a greater or lesser range of amplitude adjustment, as may be required in unusual sizes and shapes of furnaces, without affecting the operating characteristics of the apparatus.

An intermediate adjustment in the amplitude of oscillation of the spray nozzle is illustrated in Fig. 4 wherein the angularity of motion is 30° about the axis A—A and 60° about the axis B—B. It will be understood that the angularity of oscillation about the axes A—A and B—B need not be proportionately altered in changing the adjustment of the apparatus. For example, the apparatus may be adjusted for an amplitude of 60° about the axis A—A, as shown in Figs. 1 and 3, while it may also be 60° about the axis B—B as shown in Fig. 4, without affecting the uniformity of oscillations or changing the synchronized movements of the spray nozzle. The amplitude of oscillation of the spray nozzle is adjusted to correspond with the size, shape and capacity of the individual furnace served thereby. However, minor alterations in the amplitude of oscillation may be desired due to changes in the amount of liquor delivered to the nozzle or changes in furnace conditions resulting from variations in the percentage of solids contained in the liquor delivered thereto. Advantageously, such changing conditions may be compensated by proper amplitude adjustment of the mechanism connecting the oscillator and the spray nozzle to maintain desirable conditions within the recovery furnace.

In Fig. 3, the equal increments of time between the positions of the plate 45 represent an angularity of 10° in oscillatory movement about the axis A—A and 20° about the axis B—B. Likewise in Fig. 4, the same increments of time represent an angularity of 5° in the oscillatory movement of the nozzle about the axis A—A and 10° about axis B—B.

In operation, the nozzle 10 is simultaneously oscillated about the axes A—A and B—B, and the cooperative movements thereof are synchronized so as to position the plate 45 in a horizontal plane when in its upper and lower positions of oscillation about the axis A—A. On the downward movement of the nozzle 10 about the axis A—A from its upper position, the plate 45 will progressively tilt to one side about the axis B—B until, at the midpoint of movement about the axis A—A, it reaches its maximum tilted position. Thereafter, as the downward movement of the nozzle about the axis A—A continues, the plate 45 will gradually return to a horizontal position in its movement about the axis B—B, which position is reached at the lower end of nozzle movement about the axis A—A. As the nozzle moves upwardly in the operating cycle the plate 45 will progressively tilt about the axis B—B toward the side opposite to that of the downward movement, reaching a maximum at the midpoint of movement about the axis A—A. In the continuing upward movement of the nozzle beyond the midpoint, the plate 45 will gradually reassume its horizontal position which is reached at the upper position of movement about the axis A—A.

In its oscillation about the axes A—A and B—B, the nozzle is positioned so as to operate in a vertical plane equidistant from the sidewalls of the furnace, and since the point 44 on the spray plate 45 will also remain in this vertical plane throughout the operating cycle, the sheet of spray will be uniformly divided to each side of the furnace longitudinal center line. Thus, with the substantially uniform angular velocity of oscillation of the nozzle, each side wall will receive a substantially equal share of the liquor deposited thereon by the spray nozzle. Likewise, each vertical half of the furnace rear wall on opposite sides of the furnace longitudinal axis will also receive its substantially equal share of the total liquor deposited on the rear wall by the spray nozzle.

Figure 6:
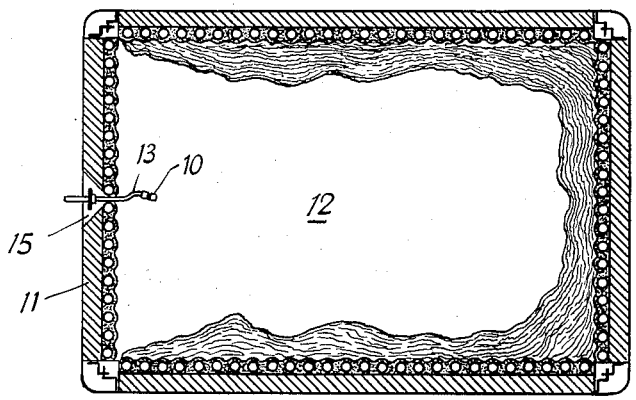
Fig. 6 is a horizontal section taken on line 6—6 of Fig. 5.

Ordinarily in the operation of such recovery processes the char will break off from the walls of the furnace in lumps of a great variety of sizes and shapes. The size of lump may vary from several cubic feet to a cubic inch or less and in spite of a substantially uniform deposition of spray on the furnace walls, the thickness of char actually remaining on the walls at any one time may vary considerably. Such a condition, typical of actual operation with most chemical recovery furnaces of this type, is shown in Figs. 6 and 7.

In a majority of chemical recovery furnace applications the spray nozzle mount of the present invention is preferably used in association with an oscillating mechanism capable of transmitting a substantially uniform velocity of motion thereto, such as with the cam-driven oscillating mechanism described. However, in some applications it may be desirable to provide a spray nozzle mounting and oscillating arrangement capable of depositing a predetermined larger or smaller amount of liquor on the walls in certain portions of the furnace. Under these circumstances the oscillating mechanism may be of the cam-driven type, having specially designed cam configurations, or may be of some other type, such as the crank-drive type disclosed in U. S. Patent 2,161,111. In any event, the spray nozzle mounting arrangement of the present invention will be particularly advantageous with any type of oscillating mechanism due to its characteristic ability to accurately reproduce the oscillatory movements initiated by the oscillating mechanism.

I claim:

1. In combination, a liquid supply pipe, a mount arranged to support said supply pipe for oscillations thereof about its longitudinal axis and about a transverse horizontal axis perpendicularly intersecting the longitudinal axis of said supply pipe, a mechanism adapted to simultaneously oscillate said pipe about said axes through selected amplitudes of coordinated movements and selected angular velocities, a spray nozzle having a spray plate extending transversely of and at an oblique angle to the longitudinal centerline of said nozzle, and a bent supply pipe connecting said nozzle and said liquid supply pipe and arranged to position said spray plate in a plane perpendicular to the plane of said longitudinal axis and the longitudinal centerline of said nozzle, said axis and said centerline intersecting at a point on the impact surface of said spray plate.

2. In combination, a liquid supply pipe, means arranged to support said supply pipe for oscillations thereof about its longitudinal axis and about an intersecting transverse horizontal axis, means for simultaneously oscillating said supply pipe at a substantially uniform angular velocity about said axes, a spray nozzle having a substantially flat plate spaced from the discharge end of said nozzle and extending across the path of liquid discharge therefrom, the axis of said nozzle intersecting the longitudinal axis of said plate at an oblique angle and perpendicularly intersecting the transverse axis of said plate, and a bent supply pipe connecting said supply pipe and spray nozzle and arranged to position said spray plate so that said longitudinal axis of oscillation intersects said spray plate at the point of intersection with the axis of said spray nozzle.

3. In combination, a liquid supply pipe, means arranged to support said supply pipe for oscillations thereof about its longitudinal axis and about a transverse horizontal axis intersecting said longitudinal axis, a mechanism arranged to simultaneously oscillate said supply pipe at a substantially uniform angular velocity through a selected angularity of movement about said axes, a spray nozzle having a substantially flat spray plate spaced from the discharge end of said nozzle and arranged in the path of discharge of and at an oblique angle to the axis of said nozzle, means connecting said supply pipe and said nozzle and arranged to position said spray plate in a plane perpendicular to the plane of said longitudinal axis of oscillation and the axis of said nozzle, and said parts being relatively arranged so that the axis of rotation and longitudinal axis of said nozzle intersect on said spray plate.

RAY O. GANGEWERE.

REFERENCES CITED

The following references are of record in the file of this patent:

UNITED STATES PATENTS

| Number | Name | Date |
|---|---|---|
| 420,141 | Baumgarth | Jan. 28, 1890 |
| 1,439,676 | Hartman | Dec. 19, 1922 |
| 1,580,478 | Fox et al. | Apr. 13, 1926 |
| 2,030,934 | Persons | Feb. 18, 1936 |
| 2,138,278 | Kernin | Nov. 29, 1938 |
| 2,161,110 | Tomlinson et al. | June 6, 1939 |
| 2,161,111 | Wilcoxson et al. | June 6, 1939 |